United States Patent [19]
Shink

[11] Patent Number: 5,505,307
[45] Date of Patent: Apr. 9, 1996

[54] INSULATED STORAGE COOLER

[75] Inventor: Joseph M. Shink, Valencia, Calif.

[73] Assignee: Auto-Shade, Inc., Moorpark, Calif.

[21] Appl. No.: 244,956

[22] PCT Filed: Oct. 14, 1992

[86] PCT No.: PCT/US92/08777

§ 371 Date: Aug. 8, 1994

§ 102(e) Date: Aug. 8, 1994

[87] PCT Pub. No.: WO94/08854

PCT Pub. Date: Apr. 28, 1994

[51] Int. Cl.$^6$ .................................................. A45C 11/20
[52] U.S. Cl. ........................................... 206/541; 206/545
[58] Field of Search .................................. 206/541, 542, 206/545, 549, 548, 236, 242, 260; 220/252, 412, 259, 254

[56]         References Cited
        U.S. PATENT DOCUMENTS 2,123,031   7/1938   Weiner ........................ 206/545
5,016,774   5/1991   Rodriguez ................... 220/254
5,156,291   10/1992  Mielke ........................ 220/254
5,190,376   3/1993   Book ........................... 206/549
5,337,911   8/1994   Holub .......................... 220/254

*Primary Examiner*—Thomas P. Hilliard
*Attorney, Agent, or Firm*—Blakely Sokoloff Taylor & Zafman

[57]              ABSTRACT

An insulated cooler which can be mounted to the floor of an automobile and provides access to open beverage containers. The cooler includes an insulated box which has a front wall separated from a back wall by a pair of side walls. The front, back and side walls are attached to a bottom wall that together define an inner cavity. The insulated cooler also has a top cover adapted to enclose the inner cavity of the box. The insulated box is small enough to be placed between the driver and front passenger of an automobile. The cooler has a strip of hook and loop material which can secure the bottom wall of the box to the carpet of the car. Additionally, the top cover has a pair of apertures adapted to receive beverage containers. The apertures may be covered by a flap which can be fastened to either the front or back walls of the box.

4 Claims, 1 Drawing Sheet

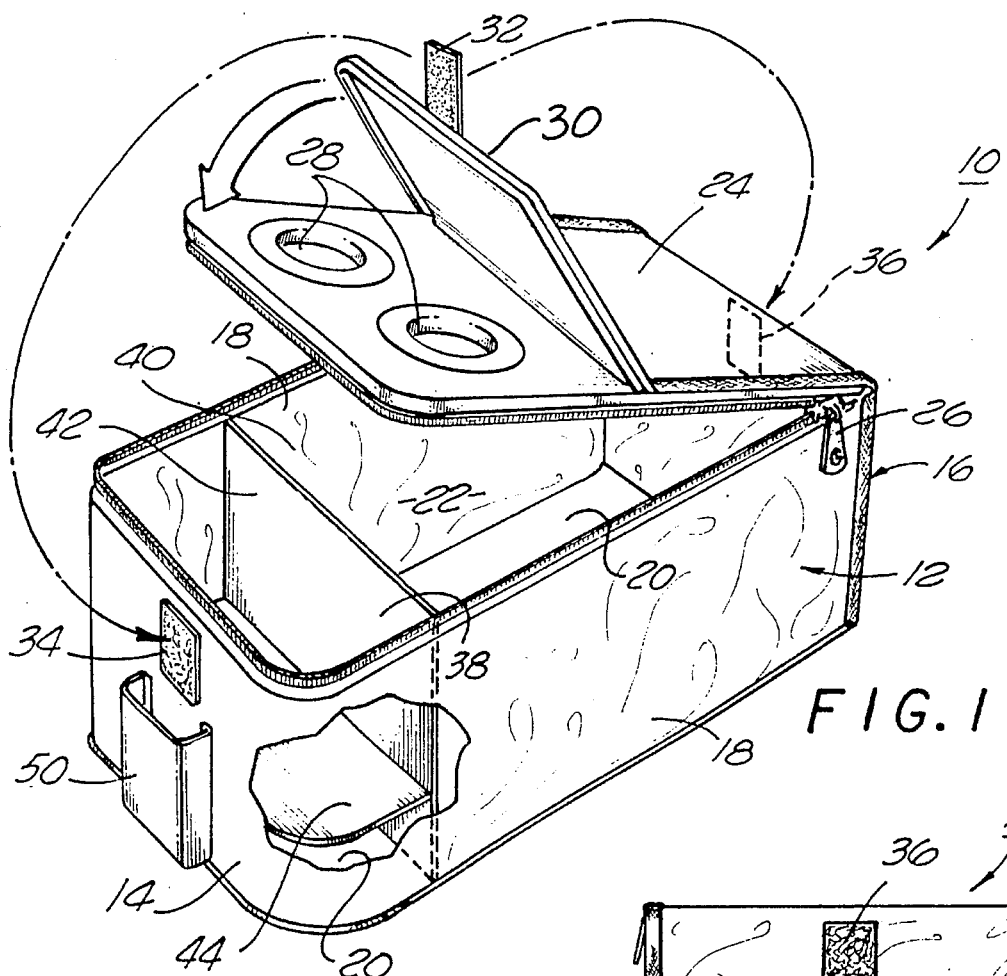
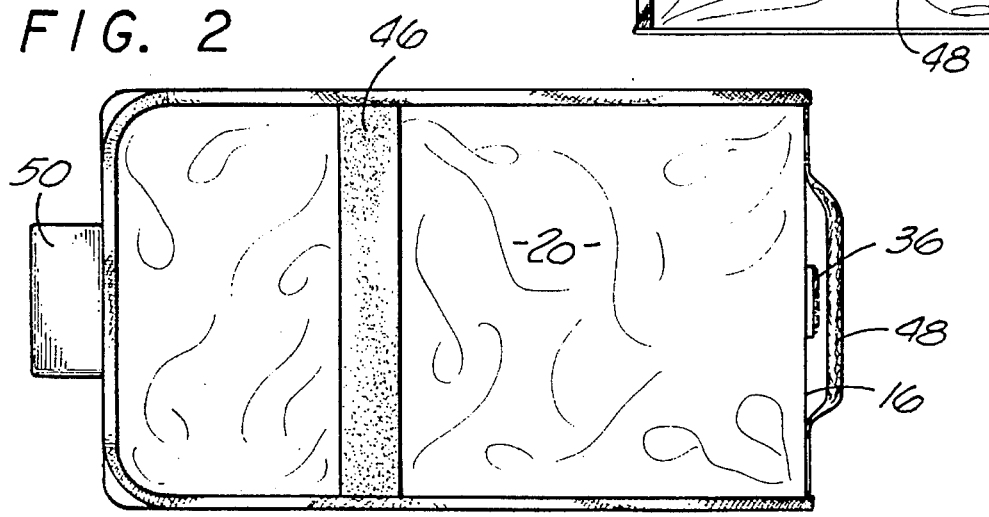

INSULATED STORAGE COOLER

BACKGROUND OF THE INVENTION

1. Field of the Invention

The present invention relates to an insulated storage bag.

2. Description of Related Art

When traveling on extended car trips it is sometimes desirable to have access to food and beverages. Storing food in the passenger compartment of an automobile typically requires the use of an insulated cooler. Most coolers are typically rigid and bulky, and require a large amount of floor space within the car. Such coolers may occupy a whole seat or floor mat, thereby taking up valuable passenger space. It would therefore be desirable to have a cooler which can fit between the driver and front passenger of an automobile. It would also be desirable if such a cooler would provide ready access to open beverage containers being consumed by the driver and/or passengers of the car.

U.S. Pat. No. 4,679,242 issued to Brockhaus discloses an insulated cooler which can be collapsed into a flat position, so that the device can be used as a seat cushion. Although the Brockhaus cooler can be collapsed into a compact container for storage, the expanded cooler is still too large to fit between the driver and front passenger of a car. Additionally, the Brockhaus cooler will not hold open beverage containers.

U.S. Pat. No. 3,085,612 issued to Gobel discloses a container assembly which has a bottle holder that can be attached to a container. Like the Brockhaus cooler, the Gobel container is impractical to use in the front seat of a car. Additionally, neither Brockhaus or Gobel disclose a container which can be readily mounted to the car, so that the cooler and contents do not move while the vehicle is being operated. It would therefore be desirable to have a portable insulated cooler which can be readily mounted to the floor of a car and provide access to open beverage containers.

SUMMARY OF THE INVENTION

The present invention is an insulated cooler which can be mounted to the floor of an automobile and provides access to open beverage containers. The cooler includes an insulated box which has a front wall separated from a back wall by a pair of side walls. The front, back and side walls are attached to a bottom wall that together define an inner cavity. The insulated cooler also has a top cover adapted to enclose the inner cavity of the box. The insulated box is small enough to be placed between the driver and front passenger of an automobile. The insulated cooler has a strip of hook and loop material which can secure the bottom wall of the box to the floor carpet of the car, to prevent the contents of the cooler from tipping and spilling.

The top cover has a pair of apertures adapted to receive beverage containers. The apertures may be covered by a flap which can be fastened to either the front or back walls of the box. The present invention therefore provides an insulated cooler which can be placed between the driver and passenger of a car, so that the occupants can consume food and beverages stored by the container. The attachment of the cooler to the carpet of the car also prevents undesired spilling when the automobile is operated.

Therefore it is an object of the present invention to provide an insulated cooler which can be placed between the driver and passenger of an automobile.

It is also an object of the present invention to provide an insulated cooler which can hold beverage containers.

It is also an object of the present invention to provide an insulated cooler which can be readily attached to the floor of an automobile.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 1 is a perspective view of an insulated cooler of the present invention;

FIG. 2 is a bottom view of the cooler of FIG. 1;

FIG. 3 is a rear view of the cooler of FIG. 1.

DETAILED DESCRIPTION OF THE INVENTION

Referring to the drawings more particularly by reference numbers, FIG. 1 shows a storage container 10 of the present invention. The storage container 10 is typically constructed to be small enough to be placed on the floor of an automobile between the driver and the front passenger of the car. The container 10 has an insulated box 12 which has a front wall 14 separated from a back wall 16 by a pair of side walls 18. The front 14, back 16 and side 18 walls are all attached to a bottom wall 20. The front 14, back 16, bottom 20 and side 18 walls define an inner cavity 22. The cooler 10 is typically constructed from a foam insulating material that is encapsulated by a fabric material on the outside of the box and a water proof reflective material on the inside of the box.

The box 12 has a top cover 24 attached to the back wall 16 and a zipper 26 that can attach the cover 24 to the front 14 and side 18 walls. The top cover 24 has a pair of apertures 28 that are constructed to provide clearance for beverage containers that can be inserted into the cooler 10. The apertures 28 may be covered by a flap 30 that is attached to the top cover 24. The flap 30 can be secured in a closed position by a first strip of loop material 32 which is attached to a first strip of hook material 34 attached to the front wall 14 of the box 12. The flap 30 can be secured in an open position by attaching the loop material 32 to a second strip of hook material 36 located on the back wall 16 of the box 12. The flap 30 completely encloses the inner cavity 22 of the box 12 when beverage containers are not inserted into the apertures 28. Although hook and loop material is shown and described, it is to be understood that the flap 30 can be secured to either the front 14 or back 16 walls by any fastening means.

In the preferred embodiment, the box 12 has a divider wall 38 which divides the inner cavity 22 into a first chamber 40 and a second chamber 42. The first chamber 42 is typically constructed to hold food or non-opened beverage containers. The first chamber 40 is preferably large enough to hold a six-pack of beverage containers. The second chamber 42 houses the beverage containers that are inserted through the apertures 28. The second chamber 42 preferably contains a riser 44 attached to the box 12 and separated from the bottom wall 20. The riser 44 is located above the bottom wall 20 so that portions of the open beverage containers remain above the top cover 24. The riser 44 allows the user to easily grab and remove the containers. In the preferred embodiment, the riser 44 is constructed to be removable, so that the user can increase the storage space of the second chamber 42.

As shown in FIG. 2, the box 12 has a second strip of loop material 46 attached to the bottom wall 20. The loop material 46 is adapted to become attached to carpet material such as the floor carpet of an automobile. The attachment strip 46 prevents the cooler 10 and contents from falling over and spilling when the automobile is being operated, particularly when the car is turning around a corner, or driving over bumps. The loop material 46 also provides a means for connecting the insulated cooler to the car, so that the cooler and contents can be easily detached and transported to another location.

As shown in FIG. 3, the box 12 may have a handle 48 attached to the back wall 16, which allows the user to easily carry the cooler 10. The cooler 10 may also have a pouch 50 attached to the front wall 14 of the box 12. The pouch 50 is preferably constructed to hold a pack of cigarettes or other relatively small items such as a remote control. What is thus provided is an insulated cooler which can be attached to the floor of an automobile between the driver and front passenger, and which can provide access to food items and open beverage containers.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A storage container that can be attached to an external mounting surface, comprising:

an insulated box having a front wall separated from a back wall by a pair of side walls, said front, back and side walls being attached to a bottom wall which together define an inner cavity, said insulated box further having a top cover adapted to enclose said inner cavity, said top cover having an aperture that provides access to said inner cavity;

a flap attached to said top cover and adapted to cover said aperture;

first attachment means for attaching said flap to said front wall;

second attachment means for attaching said flap to said back wall;

an attachment strip attached to said bottom wall, said attachment strip being adapted to attach said insulated box to the external mounting surface; and a zipper which can attach said top cover to said front and side walls.

2. A storage container that can be attached to an external mounting surface, comprising:

an insulated box having a front wall separated from a back wall by a pair of side walls, said front, back and side walls being attached to a bottom wall which together define an inner cavity, said insulated box further having a top cover adapted to enclose said inner cavity, said top cover having an aperture that provides access to said inner cavity;

a flap attached to said top cover and adapted to cover said aperture;

first attachment means for attaching said flap to said front wall;

second attachment means for attaching said flap to said back wall; and, an attachment strip attached to said bottom wall, said attachment strip being adapted to attach said insulated box to the external mounting surface and wherein said attachment means and said attachment strip are constructed from hook and loop material.

3. A storage container that can be attached to an external mounting surface, comprising:

an insulated box having a front wall separated from a back wall by a pair of side walls, said front, back and side walls being attached to a bottom wall which together define an inner cavity, said insulated box further having a top cover adapted to enclose said inner cavity, said top cover having an aperture that provides access to said inner cavity;

a zipper adapted to attach said top cover to said front and side walls of said insulated box;

a dividing wall attached to said side walls to divide said inner cavity into a first chamber and a second chamber;

a riser wall attached to said front and side walls and separated from said bottom wall;

a pouch attached to said front wall;

a handle attached to said back wall;

a flap attached to said top cover and adapted to cover said aperture;

first attachment means for attaching said flap to said front wall;

second attachment means for attaching said flap to said back wall; and, an attachment strip attached to said bottom wall, said attachment strip being adapted to attach said insulated box to the external mounting surface.

4. The container as recited in claim 3, wherein said attachment means and said attachment strip are constructed from hook and loop material.

* * * * *